United States Patent

[11] 3,550,754

[72] Inventor Robert H. Ganz
    Bergenfield, N.J.
[21] Appl. No. 670,882
[22] Filed Sept. 27, 1967
[45] Patented Dec. 29, 1970
[73] Assignee Continental Can Company, Inc.
    New York, N.Y.
    a corporation of New York

[54] PACKAGE FORMING MACHINE
    13 Claims, 20 Drawing Figs.
[52] U.S. Cl. .................................................. 198/164,
                                                        198/171
[51] Int. Cl. ..................................................... B65g 15/14,
                                                        B65g 19/02
[50] Field of Search .......................................... 198/465,
                            170, 164, 171, 22B, 34; 53/48, 159

[56]            References Cited
            UNITED STATES PATENTS
    707,200  8/1902  Bollinger ...................... 198/170(X)
    3,190,434  6/1965  Dardaine ...................... 53/48X
    3,195,288  7/1965  Sloan ........................... 198/170X Primary Examiner—Edward A. Sroka
Attorney—Diller, Brown, Ramik & Holt ABSTRACT: This invention relates to an apparatus for forming a package from a plurality of containers and a wraparound carrier blank. The apparatus includes a mechanism for transferring a blank from a hopper to a mechanism which applies the same to a group of bottles. The mechanism includes means for at least partially separating a lowermost blank from immediately adjacent blanks and a pair of articulately mounted gripping heads which prevent slippage between each gripped blank and the heads, as well as means for bowing each blank during the removal thereof. Articles about which the blanks are wrapped are bottom-supported by individual grouped supporting elements while being conveyed by pusher lugs. Means are provided for conveying different numbers of articles and/or different sizes thereof and means are provided for adjusting the relative position of each pusher lug and associated supporting elements depending upon the particular number and/or size of containers being conveyed. The pusher lugs are articulately carried by endless members to components for accurately sized articles and prevent breakage or damage thereto during the conveying operation.

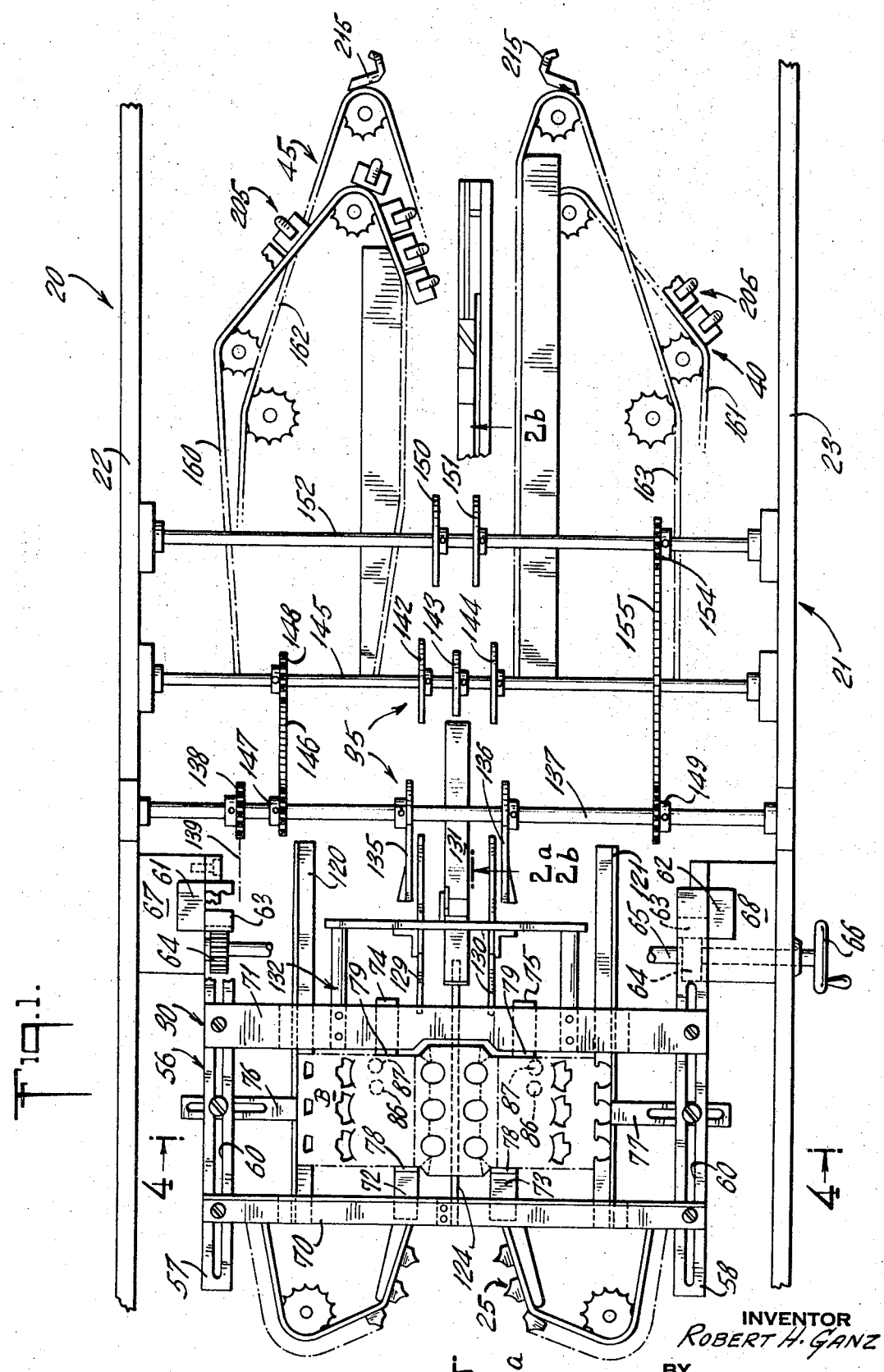

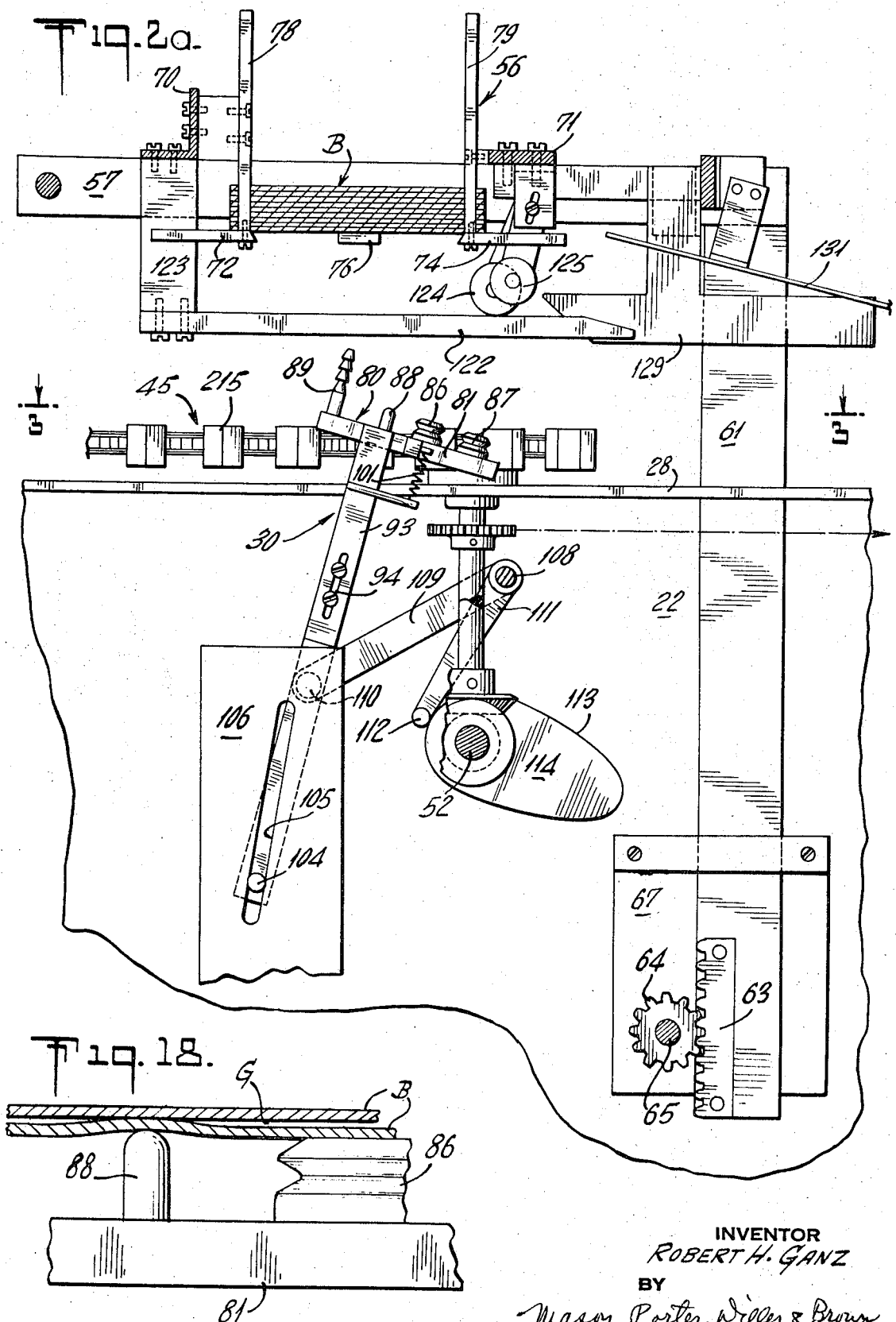

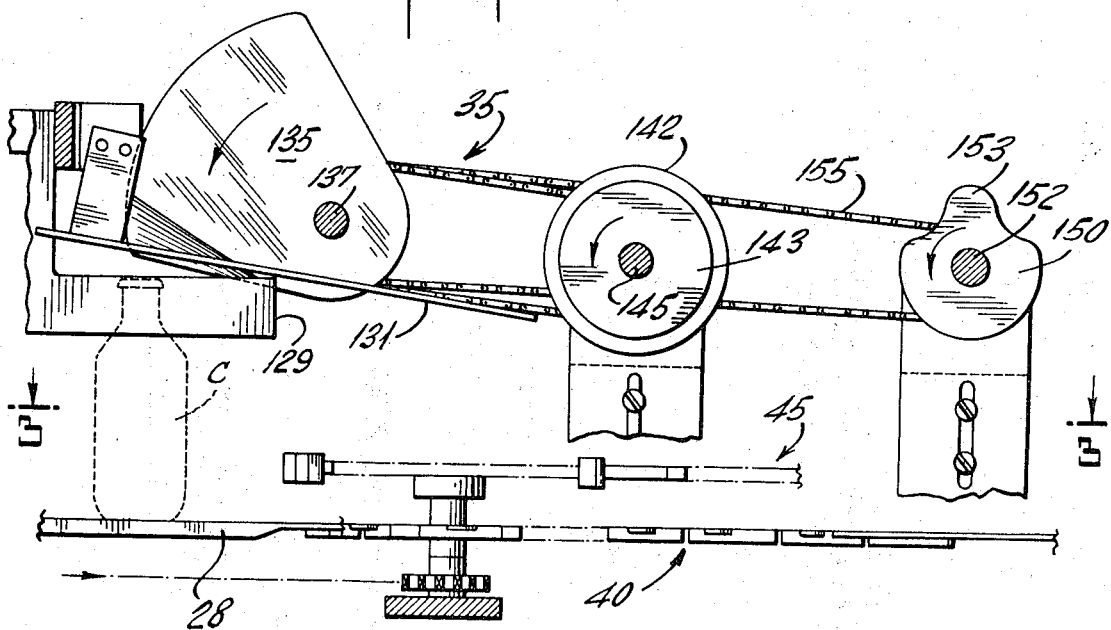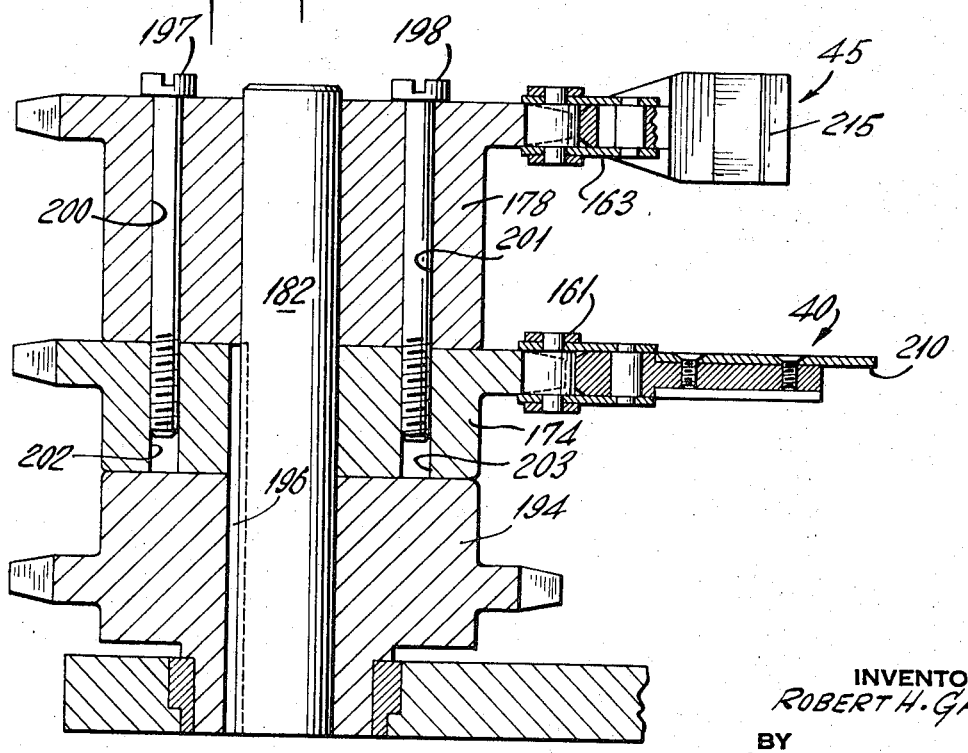

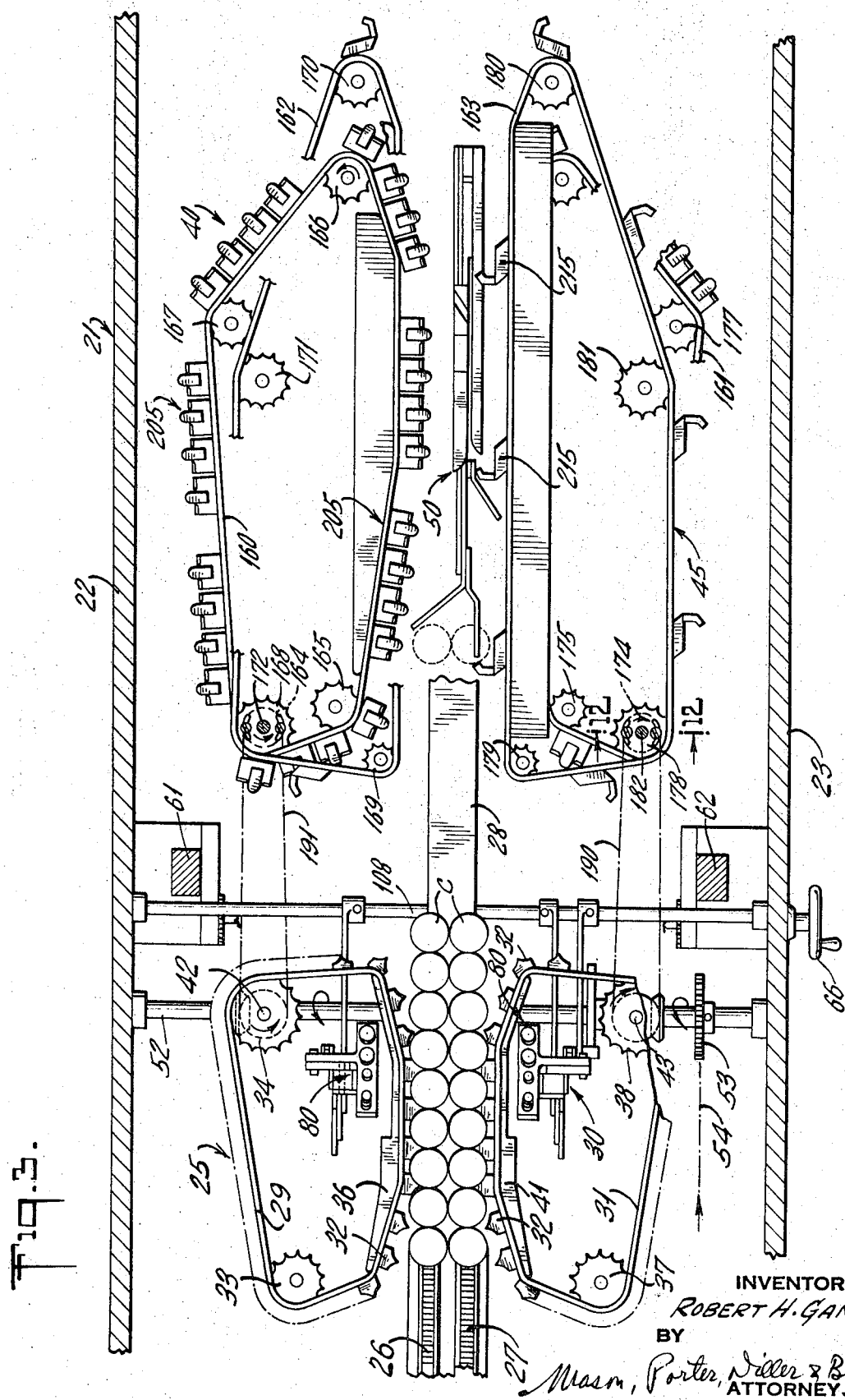

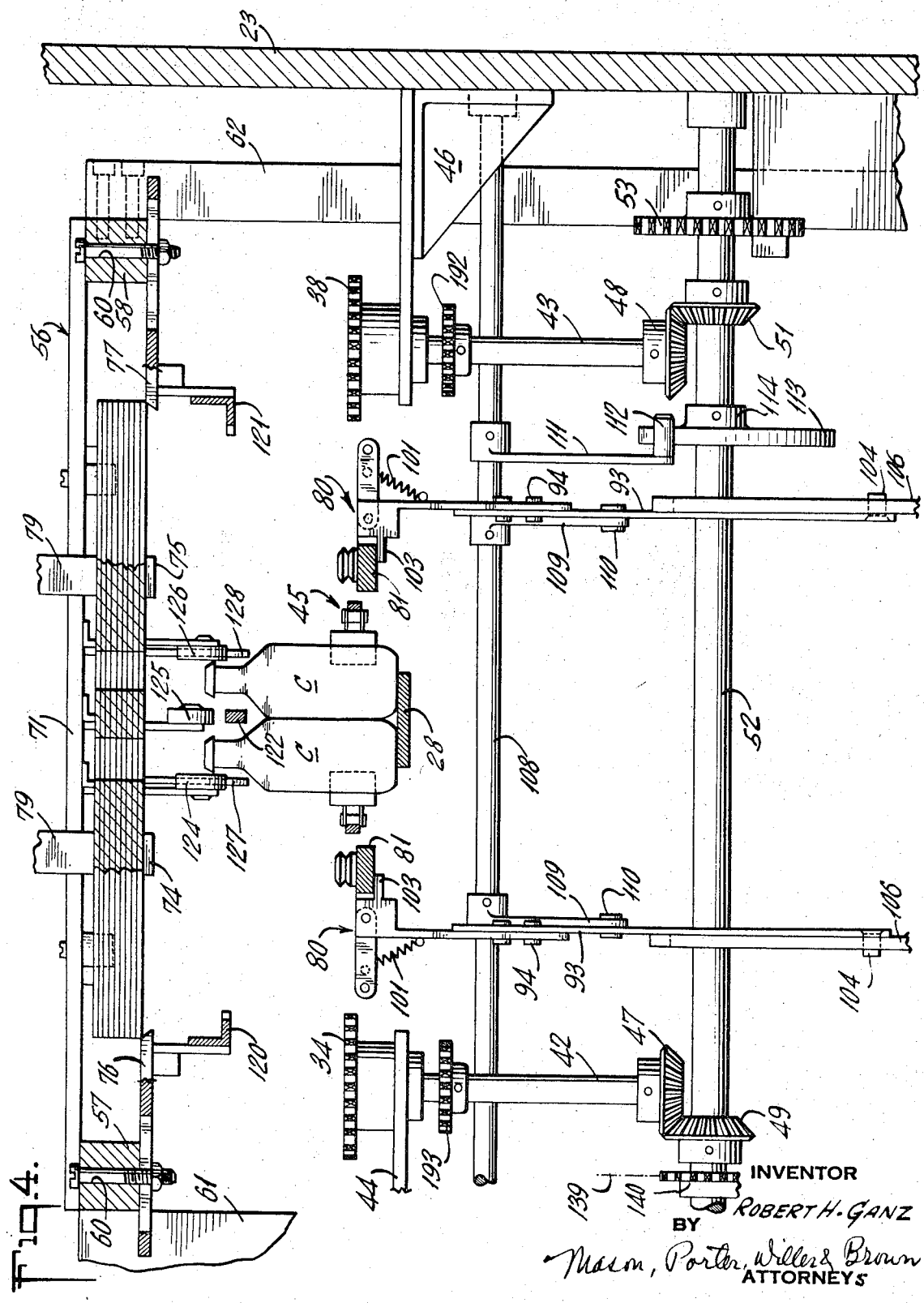

INVENTOR
ROBERT H. GANZ
BY
Mason, Porter, Diller & Brown
ATTORNEYS

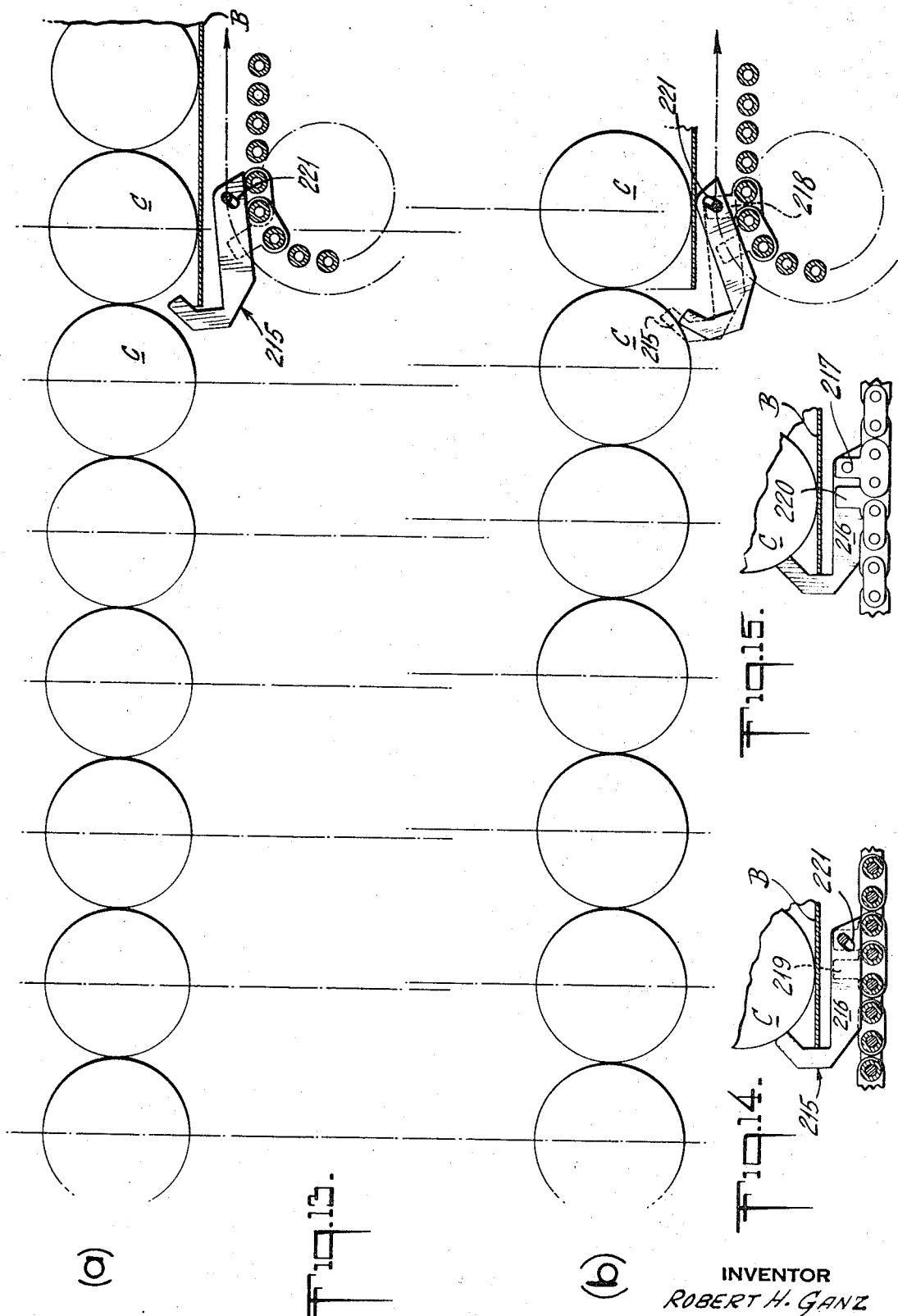

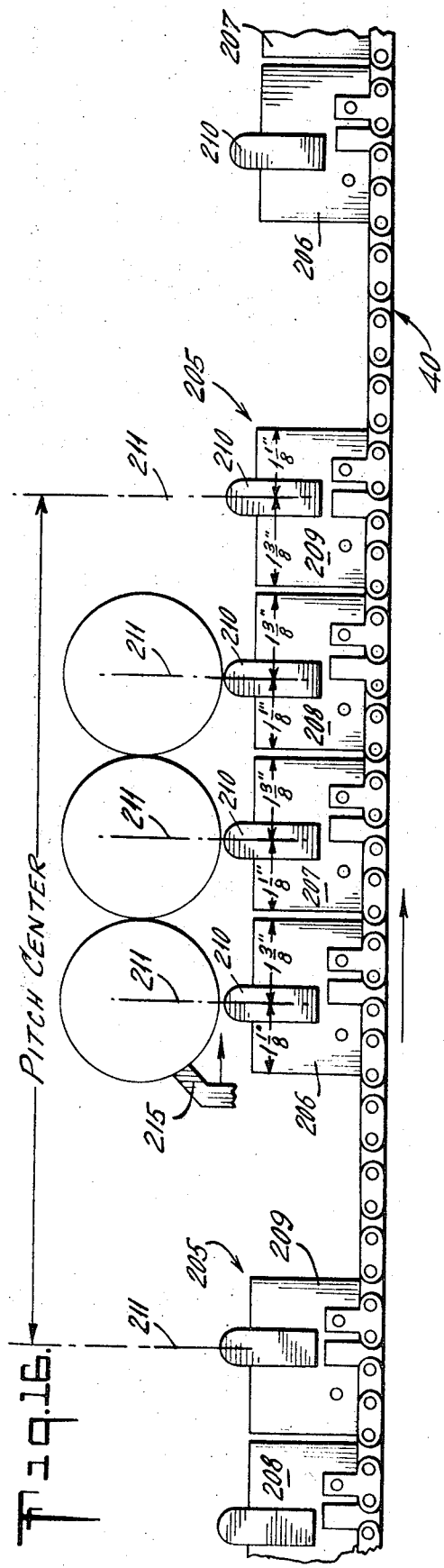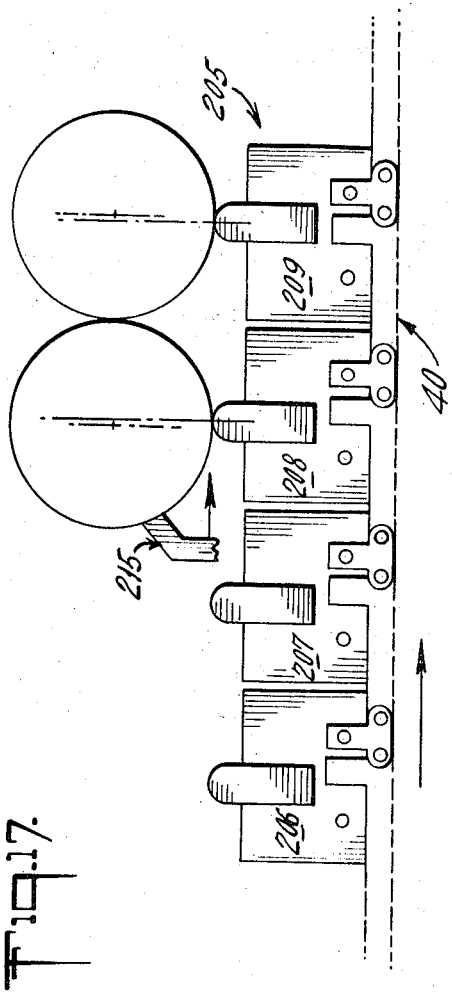

PACKAGE FORMING MACHINE

It is relatively well known to form wraparound type packages from a plurality of articles, such as glass or plastic bottles, metallic cans or similar containers, by conveying the articles along a predetermined path and progressively wrapping a carrier blank about selected groups of the articles. The carrier blanks are normally individually removed from a hopper and advanced above and in timed relationship with the conveyed articles. Conventional folders, such as rotating blades or discs, progressively folding individual carrier blanks about the grouped articles toward a generally tubular configuration after which, depending upon the carrier blank structure, the carrier blanks are secured in the generally tubular configuration thereof by, for example, interengageable locking tabs and openings formed in closure panels of the blanks.

Such conventional apparatuses are, for the most part, quite acceptable but distinct disadvantages have been found to exist in conventional mechanisms thereof. One major disadvantage is the inability of conventional blank feeding or removing mechanisms to transfer a blank from a hopper to a conveying mechanism without slippage and/or misalignment between the blank and the group of bottles about which the blank is subsequently wrapped. Exact alignment is particularly desirable in blanks having openings for receiving the necks of articles being wrapped and/or interlockable latching tabs and openings. If misalignment occurs between the neck-receiving opening and the container neck machine-jamming can occur and interlocking of the closure panels is impossible, thereby increasing downtime for adjustment, repairs, etc. and/or the formation of packages which are unlatched, insecurely latched and unacceptable.

Another disadvantage of conventional apparatuses is the excessive machine changeover time required to alter a conventional apparatus to wrap a predetermined number and/or size of containers after a different number and/or size of containers have been initially wrapped. It is quite common for a packager to, for example, wrap containers in groups of six with three containers to a line and two containers to a group (2 × 3), resulting in the conventional six-pack package. Each container is generally of the same overall size although the sizes may vary somewhat because of manufacturing tolerances. After the completion of the six-pack run it may be desirable to form 2 × 4 or 2 × 2 packages of the same or different size containers or 2 × 3 packages of a different size articles than those of the first run. When the containers are each bottom-supported by an individual conventional supporting element and conveyed by conventional pusher lugs the changeover time is appreciable because of the necessary reorientation between the pusher lugs and the supporting elements resulting, of course, in increased packaging costs.

Another disadvantage which is more particularly related to the wrapping of frangible containers, such as glass bottles, is the problem of breakage when the bottles are conveyed by conventional pusher-type mechanisms. Such mechanisms generally include a pair of endless members and a plurality of pusher lugs carried by each which engage between the trailing bottle of a leading group of bottles and the leading bottle of a trailing group of bottles. If the bottles are oversize, generally because of manufacturing tolerances, the normal center-to-center distance between trailing and leading bottles of leading and trailing groups, respectively, is foreshortened and the pusher lug which should normally enter this space and contact the trailing bottle of the leading group instead contacts the leading bottle of the trailing group and the latter bottle normally breaks or tips over thereby resulting in an improperly wrapped package and/or machine jamming.

In keeping with the specifically noted and other disadvantages of conventional packaging apparatuses, it is a primary object of this invention to provide a novel apparatus which completely overcomes the noted disadvantages by preventing relative slippage between a blank removed from the hopper and the mechanism removing the same, providing means for rapidly adjusting the apparatus for successive runs of different size and/or numbers of articles to be wrapped, and additionally providing novel conveying means which prevent the breakage of frangible containers or other damage to other though nonfrangible containers.

A further object of this invention is to provide a novel apparatus of the type immediately heretofore set forth wherein the mechanism for removing each blank from an associated hopper includes means for forming a gap between the two lowermost blanks in a hopper, and means for bowing the lowermost blank during the removal thereof from the hopper whereby slippage of the removed blank and the removing means is precluded.

A further object of this invention is to provide a novel apparatus constructed in accordance with the aforementioned objects and additionally including means for articulately mounting the pusher lugs to their associated endless conveying member whereby any pusher lug which contacts any conveyed container other than a trailing container of a group of containers can automatically shift away from the contacted container to its desired proper position adjacent and behind a trailing container.

A further object of this invention is to provide a novel apparatus of the type described including a pair of endless support conveyors each of which includes a plurality of supporting elements arranged in groups for individually bottom-supporting each container, a pair of endless pusher conveyors associated with the supporting conveyors, and means for providing relative adjustment between each pusher lug and its associated group of supporting elements whereby different groups of containers varying in size or number may be wrapped by the apparatus.

With the above and other objects in view that will hereinafter appear the nature of the invention will be more clearly understood by reference to the following detailed description, the appended claims and the several views illustrated in the accompanying drawings.

In the drawings

FIG. 1 is a fragmentary plan view of an apparatus constructed in accordance with this invention for wrapping containers in wraparound type carrier blanks and illustrates a hopper from which a lowermost blank is removed by a feeding mechanism and fed in generally overlying relationship to groups of containers individually supported by fingerlike supporting elements of a supporting conveyor while being conveyed from left-to-right by a pair of pusher conveyors.

FIG. 2a is an enlarged fragmentary sectional view taken generally along line 2a-2a of FIG. 1, and more clearly illustrates the blank feeding mechanism and one of a pair of articulately mounted gripping heads thereof.

FIG. 2b is a fragmentary enlarged sectional view taken generally along line 2b-2b of FIG. 1, and illustrates means for initiating the folding of the blank toward a tubular configuration about a group of containers.

FIG. 3 is a fragmentary sectional view with certain parts broken away for clarity taken generally along line 3-3 of FIG. 2b, and more clearly illustrates the supporting and conveying means, and means for providing relative adjustment between pusher lugs of the conveying means and associated groups of supporting elements of the supporting means.

FIG. 4 is an enlarged fragmentary sectional view taken generally along line 4-4 of FIG. 1, and illustrates the gripping heads of the blank feeding mechanism adjacent to and on opposite sides of a predetermined path along which the containers are advanced.

FIG. 12 is a highly enlarged sectional view taken generally along line 12–12 of FIG. 3, and illustrates the means for adjusting each pusher lug of the conveying means relative to its associated group of underlying supporting elements of the supporting means.

FIG. 13a is a highly diagrammatic view of a plurality of correctly sized containers, and illustrates a pusher lug articulately carried by the conveying means entering a space between a trailing container of a leading group of containers and a leading container of a trailing group of containers.

FIG. 13b is a view similar to FIG. 13a, and illustrates a plurality of containers at least some of which are of an incorrect size, and the manner in which the pusher lug is deflected by the leading container of the trailing group toward a position for subsequent contact with the trailing container of the leading group.

FIGS. 14 and 15 are fragmentary top plan views similar to FIG. 13b, and illustrate the final position of the pusher lug and its associated trailing container.

FIG. 16 is a fragmentary top plan view of a portion of the supporting means, and illustrates in relationship between three containers of a particular size the group of supporting elements associated therewith and one of the pusher lugs of the conveying means.

FIG. 17 is a fragmentary top plan view of the apparatus similar to FIG. 16, and illustrates the same group of supporting elements and pusher lug after being adjusted relative to each other for advancing containers of a larger size than those illustrated in FIG. 16.

FIG. 18 is a highly enlarged fragmentary side elevational view of a portion of one of the gripping heads, and illustrates means carried thereby for partially separating a lowermost blank in the hopper from an immediately adjacent upper blank incident to the removal of the lowermost blank therefrom.

Figure 5:
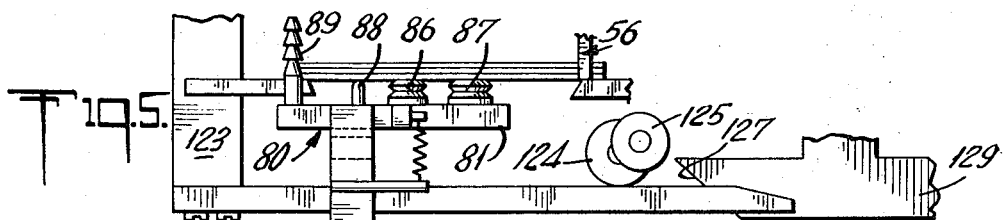
FIG. 5 is a fragmentary side elevational view of the blank feeding mechanism, and illustrates the gripping means in the uppermost position thereof and means for cyclically driving the gripping means to successively remove lowermost ones of the blanks from the hopper.

Reference is first made to FIGS. 1 and 3 of the drawings which fully illustrate the novel apparatus 20 for forming a package from a wraparound type carrier blank B and a plurality of containers C. The apparatus 20 includes a frame 21 having lateral sides 22, 23 between which are disposed a mechanism 25 for correctly spacing and aligning the containers C as they are advanced from left-to-right (FIG. 3), a mechanism 30 for feeding blanks in generally superimposed relationship to a group of the containers, means 35 for folding each blank about an associated group of the containers, means 40 for bottom-supporting the individual containers of each group, means 45 for conveying each group of containers in timed relationship with the supporting means 40, and means 50 for interlockingly securing closure panels of each blank to each other to complete the formation of the packages.

The containers C are initially fed from left-to-right by a pair of infeed conveyors 26, 27 having upper runs disposed in a horizontal plane substantially coplanar with a transfer plate 28 which is conventionally supported medially of the walls 22, 23. The transfer of the containers C from the conveyors 26, 27 to the plate 28 is effected by the separating or grouping means 25 in the manner best illustrated in FIG. 3 of the drawings.

The spacing means 25 include a pair of endless conveyor members 29, 31 carrying a plurality of separating elements 32. The endless member 29 is entrained about sprocket 33, 34 and a guide 36 while the endless member 31 is entrained about sprockets 37, 38 and a guide 41. The guides 38, 41 define generally converging and diverging upstream and downstream portions of the separator means 25 to facilitate the respective introduction and withdrawal of the separating elements 32 relative to the containers C.

The sprockets 33, 37 are keyed to shafts (unnumbered) which are suitably journaled to the frame 21 of the apparatus 20. The sprockets 34, 38 are similarly keyed to shafts 42, 43, respectively, (FIGS. 3 and 4) which are in turn supported from the walls 22, 23 by respective journaling brackets 44, 46. The lower ends of the shafts 42, 43 carry beveled gears 47, 48 which are in mesh with respective gears 49, 51 keyed to a shaft 52 which is journaled between the walls 22, 23. A sprocket 53 is also keyed to the shaft and a main drive chain 54 connects the sprocket 53 with a main drive motor (not shown).

When the motor is in operation the main drive sprocket 53 and its associated main drive shaft 52 are rotated in a counterclockwise direction as viewed from the sidewall 23 toward the sidewall 22. This counterclockwise rotation of the shaft 52 imparts clockwise rotation to the sprocket 38 and its associated endless member 31 and counterclockwise rotation to the sprocket 34 and its associated endless member 29. The innermost runs (unnumbered) of the endless members 29, 31 are therefore advanced from left-to-right at identical speeds with the spacing elements 32 in transverse alignment thereby both advancing the containers C and correctly spacing the containers to receive thereon individual blanks B removed from a hopper 56 of the blank removing and feeding means 30.

The hopper 56 of the blank removing and feeding mechanism 30 is mounted for adjustable movement upwardly and downwardly relative to the transfer plate 28, as well as being adjustable to receive various size blanks B. The hopper 56 includes a pair of lateral side rails 57, 58 adjacent and generally parallel to the sidewalls 22, 23. The rails 57, 58 each include an identical slot 60. The rails 57, 58 are secured to respective vertical supports 61, 62 (FIGS. 1, 2a and 4). Each of the vertical supports 61, 62 carries a rack 63 at a lower end portion thereof which is in meshed relationship with an associated gear 64 fixed to a shaft 65. The shaft 65 includes a handwheel 66 adjacent the sidewall 23 which can be manually grasped and rotated to rotate the shaft 65, the associated gears 64 and thereby raise or lower the supports 61, 62 which are guided during the movement thereof in slotted housing 67, 68 secured to respective walls 22, 23 (FIG. 1).

A pair of rails 70, 71 are positioned generally normal to the rails 57, 58, and are joined thereto in adjustable relationship by bolts (unnumbered) received in the slots 60. The rails 70, 71 can thereby be moved toward or away from each other to vary the size of the hopper to accommodate blanks of different widths.

A stack of blanks are supported in the hopper 56 by a plurality of supporting tongues 72 through 77. The tongues 72, 73 and 74, 75 are connected to the respective rails 70, 71 by respective vertical guides 78, 79 and conventional fasteners (unnumbered). Transverse edges of the stack of blanks are supported by the tongues 76, 77 which, as best illustrated in FIGS. 1 and 4 of the drawings, are carried by the rails 57, 58 and can be adjusted normal thereto by the unnumbered slot and bolt connections shown in these FIGS. Therefore, by adjusting the rails 70, 71 toward or away from each other the tongues 72 through 75 can be spaced to increase or decrease the width of the hopper while the tongues 76, 77 may be adjusted to increase or decrease the length thereof. In this manner the hopper 56 can be quickly varied in size to accommodate blanks of different lengths, widths and configurations.

Figure 10:
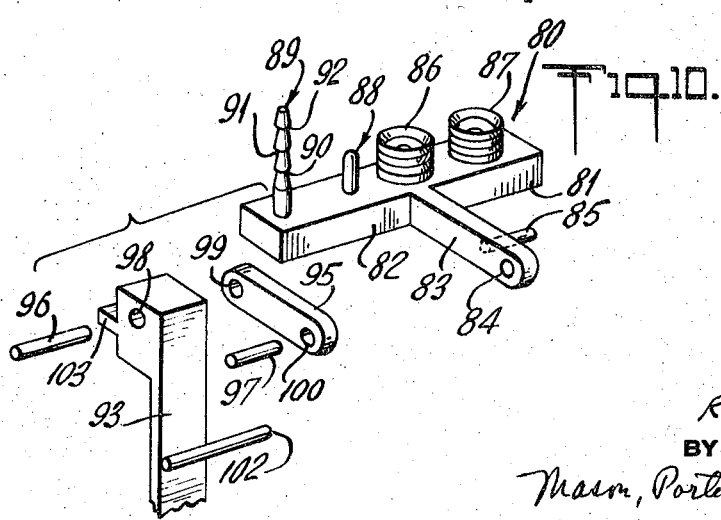
FIG. 10 is an exploded view of one of the gripping heads, and more clearly illustrates the manner in which the gripping head is connected to its associated arm.

A pair of means, each generally designated by the reference numeral 80 FIGS. 2a and 4) are provided for gripping each lowermost blank in the hopper 56, removing the blank therefrom, and advancing the blank in the direction of container travel to assemble the gripped blank and a selected group of the containers. The pair of blank gripping means 80 are generally identical to each other and each includes a generally T-shaped gripping head 81 (FIG. 10) having a base 83 and a leg 82 which is apertured at 84 and carries a pin 85. A pair of vacuum or suction cups 86, 87 is secured to and is placed in fluid communication with a conventional valved vacuum source (not shown). Means 88 in the form of an upstanding rigid post is associated with each gripping head 81 adjacent the vacuum cup 86 for partially separating the lowermost blank in the hopper 56 from an immediately adjacent upper blank to prevent more than one blank from being removed from the hopper during the operation of the mechanism 30, as will appear more fully hereafter. Means 89 in the form of a rigid upstanding post which is peripherally relieved to define a plurality of shoulders 90—92 is also carried by each gripping head 81 adjacent the blank separating means 88. The shoulders 90—92 of each of the means 89 function to overlyingly contact an uppermost surface of the blank being removed by the gripping means 80 to prevent relative slippage between the blank and the gripping means during the removal of the blank from the hopper and the subsequent transfer to the group of containers in a manner which will also appear more apparent hereafter.

Each gripping head 81 is pivotally connected to a two-piece arm 93 having a slot and bolt connection 94 (FIG. 2a) for adjusting the length of the arms. Each gripping head 81 is connected to its associated arm 93 by a lost-motion link 95 and a pair of pins 96, 97. The pin 96 is received in openings 98, 99 of its associated arm 93 and link 95 while the pin 97 is received in another aperture 100 of the link 95 and the aperture 84 of the gripping head leg 83. A spring 101 is connected between the pin 85 and a pin 102 (FIGS. 2a, 4 and 7) carried by the arm 93. The function of the spring 101 is to normally bias the base 82 of each of the gripping heads 81 into contact with a ledger stop 103 of each arm 93 to maintain the gripping heads 81 in a generally horizontal plane, in the manner illustrated in phantom outline in FIG. 8 of the drawings.

A lower end portion (unnumbered) of each of the arms 93 carries a pin 104 which is guidingly slidingly received in a slot 105 of a vertical plate 106 secured rigidly to the base (unnumbered) of the framework 21.

Each of the arms 93 is connected to a shaft 108 by a link 109 which is pivotally connected at 110 to the arm 93 and rigidly connected at its opposite end to the shaft 108. The shaft 108 is journaled between the walls 22, 23 and has fixedly connected thereto a link 111. The link 111 has a cam follower 112 at its terminal end which engages against a cam surface 113 of a cam 114. The cam 114 is connected to the shaft 52 which, as was heretofore noted, rotates in a counterclockwise direction as viewed in FIGS. 2a and 7.

Assuming that the gripping means 80 are positioned as viewed in FIG. 2a of the drawings and the shaft 52 is rotating counterclockwise, the cam surface 113 acting against the cam follower 112 turns the link 111 in a clockwise direction which rotates the shaft 108 in the same direction along with each of the links 109. The clockwise motion of the links 109 imparts upward and rearward movement to the arms 93 and the gripping heads 81 carried thereby due to the upward guiding movement of each pin 104 in its associated slot 105 until the elements of the mechanism 30 are in the position illustrated in FIG. 5 of the drawings.

Figure 6:
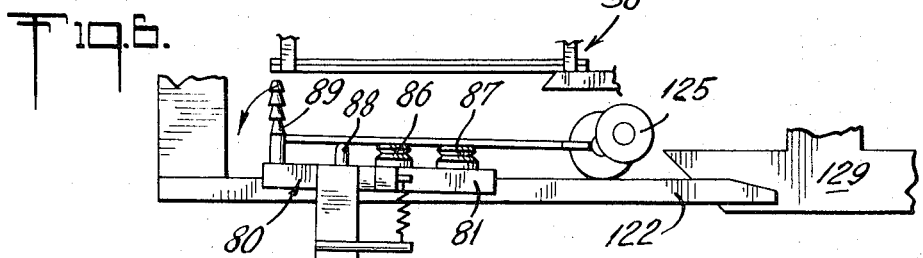
FIG. 6 is a fragmentary side elevational view of the blank feeding mechanism, and illustrates a blank carried by the gripping head just after being removed from the hopper.

Assuming the vacuum cups 86, 87 were placed in fluid communication just prior to contact with the lowermost blank subsequent downward movement of the gripping means 80 toward the position shown in FIG. 6 of the drawings might cause not only the removal of the lowermost blank but a next succeeding blank unless otherwise provided for. In the instant case the removal of the next lowermost blank is prevented by forming at least a partial gap G (FIG. 18) between the two lowermost blanks by the posts 88. During the upward movement of each gripping head 81 its associated post 88 contacts the lowermost blank and deforms the material by compressing and reducing the normal thickness thereof. This slightly lifts all of the blanks above the lowermost blank to form the gap G which materially reduces the area of contact between the lowermost and next succeeding blank thereby reducing frictional and drag forces. It should also be noted that in the absence of the gap G the vacuum drawn through the porous material (paperstock) of the lowermost blank would also affect the next blank and both could be withdrawn from the hopper. However, the gap permits air to be drawn from the lateral sides of the blanks under the influence of any vacuum drawn through the porous lowermost blank thereby precluding the withdrawal of a next succeeding blank.

Referring again to FIG. 5 of the drawings, it will be noted that the relieved posts 89 of each of the gripping heads 81 are positioned slightly (one sixteenth in.) to the left of the leftmost edge of the blanks in the hopper 56. Any tendency of the blank carried by the gripping means 80 to move rearward is thereby resisted by each of the relieved posts 89 while any tendency of the blank to move upwardly and away from the gripping heads is prevented by the shoulders 90—92. In this manner relative movement or slippage between the gripped blank and the gripping heads is substantially reduced, maintained at a minimum and in most cases eliminated completely, thereby maintaining the blank properly aligned for subsequent application to a group of the containers C.

Figure 7:
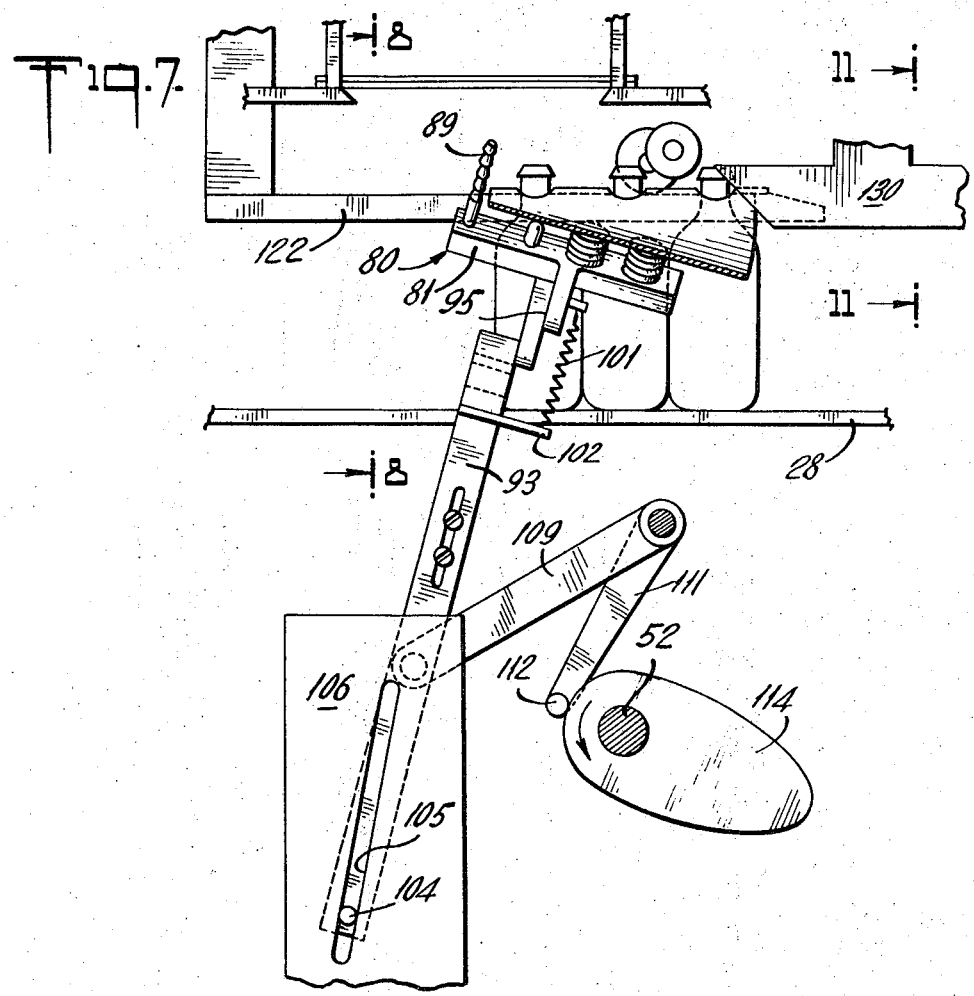
FIG. 7 is a fragmentary side elevational view of the blank feeding mechanism, and illustrates the blank being positioned upon a group of containers during the advancement of the blank and the containers.

With the continued rotation of the shaft 52 the gripping heads 81 move from the position shown in FIG. 6 toward the position illustrated in FIG. 7. During this movement opposite ends of the blank carried by the gripping means 80 are bowed (FIG. 8), a central portion of the blank is supported, and a leading edge of the blank is guided downwardly and to the right both by the movement of the arms 93, a pair of guides and pivoting movement of the gripping heads, as will be more apparent immediately hereafter.

Figure 8:
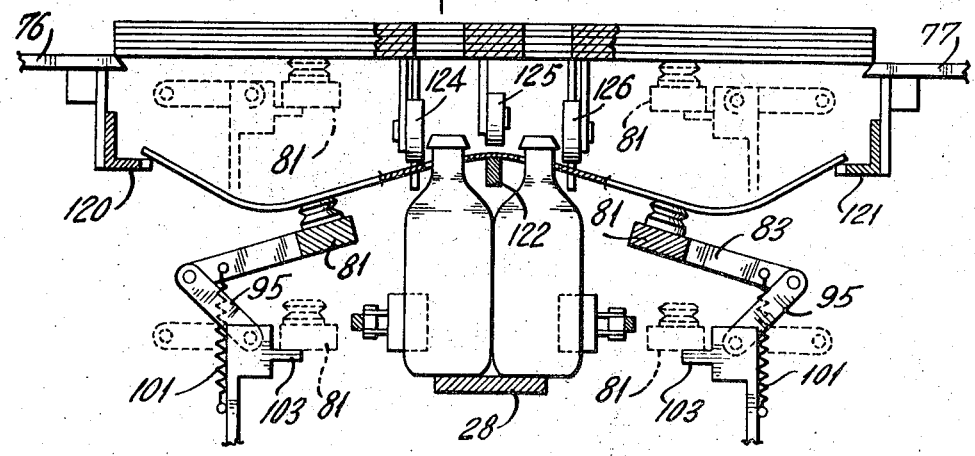
FIG. 8 is a fragmentary sectional view taken generally along line 8–8 of FIG. 7, and illustrates means for bowing the removed blank, and lost-motion means connecting each gripping head to an associated arm of the feeding mechanism.

Referring now to FIGS. 1 and 8 of the drawings, it will be seen that as the gripping heads 81 descend from the phantom outline position in FIG. 8 toward the solid line position thereof opposite ends portions of the gripped and removed blank contact rails 120, 121 which are in turn supported by the respective tongues 76, 77. A centermost portion or top panel of the blank is also drawn into contact with an upper surface of a support 122 having an end portion 123 connected to the rail 70 and an opposite terminal end portion. Therefore, as the blank is drawn downwardly it initially contacts the rails 120, 121 and the support 122 at which time the blank is disposed entirely horizontally. However, as the arms 93 continue to descend and move in the direction of container travellike movement of the gripping heads begins to bow the blank which facilitates the guiding of the container necks (unnumbered) into neck-receiving openings (also not shown) of the blank. Slippage between the gripping heads and the blanks during this bowing is precluded by the lost-motion connection of each gripping head to its associated arm 93. Any tendency of the vacuum cups to release the blank or shift relative to the blank is prevented by the movement of the gripping heads closer toward the containers C as the blank is bowed due to the lost-motion connection, as is readily apparent from a comparison of the uppermost gripping heads 81 in phantom outline in FIG. 8 and the solid outline illustration in this same FIG. As the gripped blank reaches the position illustrated in FIG. 9 of the drawings the vacuum to the cups 86, 87 is discontinued and the gripping heads are drawn from the solid to the phantom outline position in FIG. 9 by the associated springs 101.

Just prior to the release of each blank by the gripping means 80, the forwardmost edge of the blank is positioned beneath three rollers 124—126 (FIG. 4) which are supported for vertical adjustment from the rail 71. The forward edge of the side panels of the blank are also progressively guided downwardly into generally embracing relationship to the group of containers by inclined guide surfaces 127, 128 of respective guides 129, 130, carried by the rail 71 (FIGS. 1 and 4). A leaf spring 131 (FIGS. 1 and 11) between the guides 129, 130 urges the top panel of the blank into intimate engagement with the upper surface of the support 122 and the blank is now positioned for further folding by the mechanism 35. It is to be noted that the guides and the leaf spring are carried by a generally U-shaped frame 132 connected to the rail 71 and are therefore moved with the rail 71 during any adjustment thereof.

Figure 11:
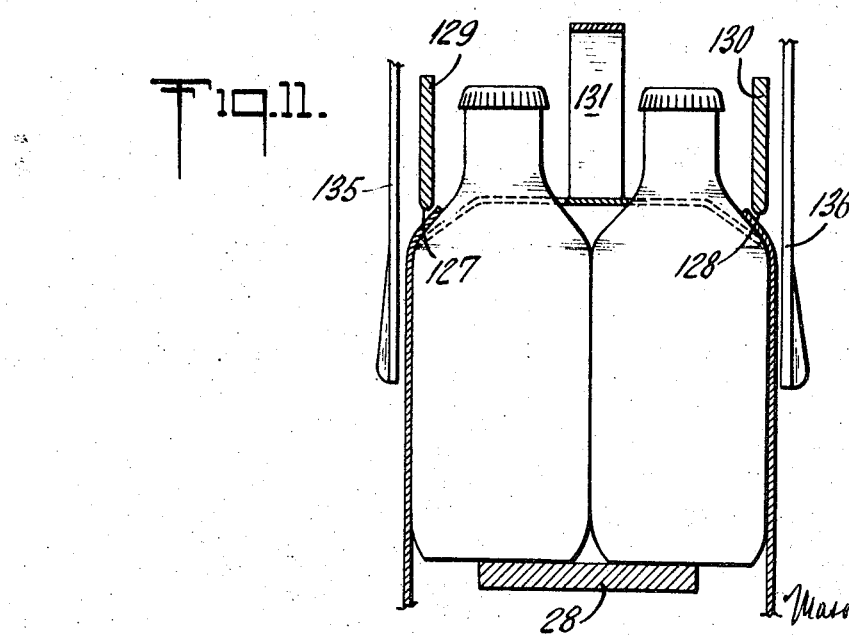
FIG. 11 is an enlarged sectional view taken generally along line 11–11 of FIG. 7, and illustrates means for guiding side panels of the blank about the outer peripheries of the containers.

After the blank and containers pass beyond the guides 129, 130 rotating folders 135, 136 (FIGS. 1, 2b and 9) disposed outboard of the respective guides 129, 130 fold the blank to the configuration thereof illustrated in FIG. 11 as the folders rotate with a shaft 137 to which they are keyed. The shaft 137 (FIG. 1) is journaled between the walls 22, 23, and is rotated by means of a sprocket 138, a drive chain 139 and a sprocket 140 keyed to the shaft 52 (FIG. 4).

As the blank and group of containers pass beyond the folding mechanism 35 the top panel of the blank is urged into intimate conforming relationship with the containers by means of three rotating rollers 142, 143 and 144 fixed to a shaft 145 (FIG. 1) which is journaled between the walls 22, 23. The shaft 145 is driven by a chain 146 through sprockets 147, 148 fixed to the respective shafts 137, 145. The rollers 142 through 144 preferably include resilient peripheral surfaces and are so spaced along the shaft 145 that the roller 143 urges the top panel downwardly along its center line while the rollers 142, 144 urge shoulder side panels of the blank downwardly and into intimate engaging relationship with the shoulders (unnumbered) of the containers.

The leading and trailing edges of each of the blanks B illustrated in the drawings is provided with respective forwardly and rearwardly directed end-identification panels which are designed to be deflected downwardly to a position substantially normal to the axis of the completed tubular package. In order to deflect these end-identification panels of the top panels downwardly a pair of indenting blades 150, 151 (FIGS. 1 and 2b) are fixed to and rotatably carried by a shaft 152 journaled between the sidewalls 22, 23. The indenting blades 150, 151 each includes a cam lobe portion 153, and are so driven as to first deflect the leading end-identification panel downwardly during a first revolution of the shaft 152 and the trailing end-identification panel downwardly during the next succeeding revolution. The drive for the shaft 152 and the indenting blades carried thereby is through a pair of sprockets 149, 154 keyed to the shafts 137, 152, respectively, and a chain 155 entrained about these sprockets.

Referring to FIG. 2b of the drawings, it is to be noted that the transfer plate 28 terminates adjacent and substantially in a common plane with the supporting means 40. At this point of transition the containers are individually bottom-supported by the supporting means while being now advanced by the conveying means 45.

Reference is made particularly to FIGS. 1 and 3 of the drawings which illustrate the supporting means 40 as being formed by a pair of endless chains or members 160, 161 and the conveying means 45 as a similar pair of endless chains or conveyors 162, 163 positioned above the endless members 160, 161. The endless member 160 is entrained about sprockets 164 through 167 keyed to vertical shafts (unnumbered) suitably journaled to the frame 21 while the endless member 162 is similarly entrained about sprockets 163 through 171 keyed to respective unnumbered shafts journaled to the frame 21, it being noted that the sprockets 164 and 168 are connected to an identical shaft 172 for a reason to be more fully set forth hereafter. The endless member 161 is likewise entrained about sprockets 174 through 177 while the endless member 163 is entrained about sprockets 178 through 181, it being noted that the sprocket 174, 178 are likewise carried by a common shaft 182 (FIGS. 3 and 12).

The inner runs of the supporting and conveying mechanism 40, 45, respectively, are driven from left-to-right by means of a pair of drive chains 190, 191 entrained about and driven by sprockets 192, 193 connected to the respective shafts 43, 42 (FIG. 4) and a sprocket 194 connected to each of the shafts 172, 182 in the manner best illustrated in FIG. 12 of the drawings.

The following description of the relationship between the sprockets 174, 178 and the relationship thereof to the endless members 161, 163 is equally applicable to the sprockets 164, 168 and the associated endless members 160, 162. As is readily apparent from FIG. 12 of the drawings the sprockets 174, 194 are commonly secured to the shaft 182 by a key 196. The sprockets 174, 178 are secured to each other by a pair of bolts 197, 198 which project through arcuate slots 200, 201 respectively of the sprocket 178 and are in threaded engagement with threaded apertures 202, 203. The arcuate configuration of the slots formed in the sprocket 178 is best illustrated in FIG. 3 of the drawings. Upon loosening the bolts 197, 198 the sprocket 178 can be turned clockwise or counterclockwise to move the endless member 162 relative to the endless member 161. Upon repositioning these endless members the bolts 197, 198 may again be tightened to secure the sprocket 178 to the sprocket 174 after which the selected relative position of the endless members 161, 163 remains unchanged unless the bolts 197, 198 are again loosened. This relative adjustment between the endless members 161, 163, as well as similar relative movement of the endless members 160, 162 permits the rapid adjustment of the mechanisms 40, 45 to accommodate different numbers of containers being wrapped by each blank, as will be more apparent hereafter.

Each of the endless members 160, 161, carries a plurality of identical groups 205 of supporting elements 206, 207, 208, and 209. Each supporting element 206 through 209 includes a finger 210 having a center line 211. The function of the fingers 210 is to enter into an associated opening (unnumbered) in the side panels of the blanks and engage the bottommost surface of each container to support the same during the movement thereof from left-to-right in the manner more fully disclosed in the commonly assigned application to Robert H. Ganz, Ser. No. 623,893, filed Mar. 17, 1967. However, in addition to so functioning the supporting elements 206 are constructed and arranged in the groups 205 to transfer different numbers of the containers during different runs and/or different numbers and sizes of containers during different runs to reduce the changeover time required by similar conventional apparatuses.

As is best illustrated in FIG. 16 of the drawings, the groups 205 of supporting elements 206 through 209 are spaced from each other a predetermined distance and in the example illustrated in FIG. 16 the pitch center is 13inches as measured between the center lines of the two illustrated supporting elements 209, 209. It will be also noted that the distance between the center line of the supporting elements 206 through 208 and a leftmost edge of each is 1⅛ inches while the distance between the center line of each of these same supporting elements to its rightmost edge is 1⅜ inches. However, the supporting element 209 of each group 205 is positioned such that the distance between its center line and its leftmost edge is 1⅜ inches while the distance between its center line and the rightmost edge is 1⅛ inches. Thus, assuming as in the illustrated embodiment of the invention that containers having 2½ inches diameters are being wrapped by each of the blanks B, each container is supported upon each of the supporting elements 206, 207 and 208 but no containers are supported by the supporting elements 209 as shown in FIG. 16. If after wrapping six-pack of 2½ inches diameter containers a packager desires to wrap, for example, four-pack packages of containers having 2½ inches diameters the containers are supported upon the supporting elements 208, 209, as illustrated in FIG. 17 of the drawings. The center-to-center distance of the fingers of the supporting elements 208, 209 is 2¾ inches, thereby corresponding closely to the center-to-center distance (2⅞ inches) of the containers. This changeover between the numbers and/or sizes of the containers between two different runs is therefor accomplished without in any way altering the supporting elements 206 through 209, and all that is required is to reposition a pusher lug 215 of the mechanism 45 relative to its associated group 205 of supporting elements. This repositioning is accomplished by the mechanism illustrated in FIG. 12, as well as the similar unillustrated mechanism associated with the sprockets 164, 168, in the manner heretofore described. Therefore, assuming again the 2½ inches diameter containers are being conveyed as illustrated in FIG. 16 the pusher 215 shown in this FIG. contacts the trailing container as does a similar pusher (not shown) transversely opposite thereto to advance the containers from left-to-right as they are supported on each of the supporting elements 206 through 208. However, in the case of the larger diameter containers the endless members are shifted relative to each other to bring the pusher 215 of FIG. 17 to a position at which the trailing container supported upon the supporting element 208 is contacted to advance these containers to the right simultaneously with the support thereof upon the supporting elements 208, 209. Thus, without appreciable effort or delay the simultaneously driven mechanisms 40, 45 can be stopped, shifted relative to each other depending upon the size and/or number of containers to be packaged, and restarted for another packaging run.

Reference is now made to FIGS. 13a through 15 of the drawings which illustrate the manner in which the pusher lugs of the mechanism automatically compensate for incorrectly sized containers being transported by the mechanisms 40, 45. In FIG. 13a a plurality of containers which are each of a correct external diameter are shown being advanced to the right as the pusher lug 215 enters a space between the trailing container of a leading group of containers and a leading container of a trailing group of containers. The pusher lug 215 is of a generally J-shaped configuration and includes a leg 216 positioned between a pair of ears 217, 218 of a leading link of the endless member and a pair of ears 219, 220 of a trailing link. A pin connected between the ears 217, 218 is passed through an inclined slot 221 formed in the leg 216 with the slot having an axis disposed at an angle of approximately 45° when the leg 216 is in parallel relationship to its associated endless member (FIG. 14).

Again referring specifically to FIG. 13a of the drawings, assuming all of the containers are correctly sized the pusher lug enters the space or gap shown until contact is made with the trailing container (FIGS. 14 and 15) after which the lug 215 and a transversely adjacent lug convey the containers and the associated blank to the right as shown in these FIGS.

Assuming, however, that a container or a plurality of the containers is of an incorrect size, as shown in FIG. 13b of the drawings, any error in the container size is compounded and unless otherwise provided for the pusher lug 215 cannot be properly presented to the trailing containers as necessary and leading containers are struck, broken or tipped over. For example, assuming that one or more of the containers in FIG. 13b are oversize diameterwise the centers of the containers shift to the right as is readily apparent from a comparison of FIGS. 13b and 13a, thereby resulting in the shifting of the gap between the trailing container of a leading group which is being wrapped and the leading container of a trailing group. When this occurs in conventional apparatuses and is not otherwise provided for a rigidly mounted lug would move to the phantom outline position illustrated in FIG. 13b thereby breaking the contacted container or toppling over the same. However, any of the pusher lugs 215 which contact a container in the manner illustrated in phantom outline in FIG. 13b are cammed to the right to the solid position by the contact with this container and the slot and pin arrangement for entry into the space between the two containers. The pusher lug of FIG. 13b is, in effect, cammed inwardly to the right during its movement and enters the gap between the containers irrespective of variations in the diameters which in accordance with the invention may be as high as ⅜ inch variance between every three containers.

The mechanism 50 completes the formation of the package in the manner fully disclosed in the noted application, and a further description thereof is believed unnecessary for a complete understanding of this invention.

It is believed apparent from the foregoing that novel and advantageous provisions have been made for carrying out the desired ends, but it is to be understood that variations may be made in the disclosed apparatus without departing from the spirit and scope of this invention. For example, the arrangement of the supporting elements 206 through 209 can be changed, if necessary, to accommodate packages other than 2 × 3 (six-pack), 2 × 4 (eight-pack), and 2 × 2 (four-pack) between 2½ inches to 2⅞ inches diameters, as can now be accommodated by the disclosed arrangement. The numbers of supporting elements in each group 205 can be increased or decreased and variations in the center-to-center distance between the fingers 210 may be achieved by, for example, removing any one of the supporting elements from its associated endless member, rotating the same 180°, and reattaching the supporting element to the endless member. Each supporting finger 210 is also removed from the position shown in FIG. 12 and inserted in the unnumbered lower slot thereby maintaining all the supporting fingers 210 in an identical horizontal plane.

Figure 9:
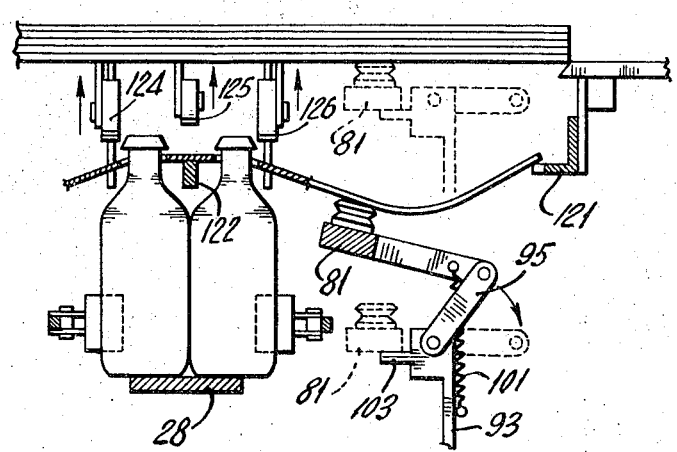
FIG. 9 is a fragmentary view similar to FIG. 8, and illustrates the position of the blank just prior to the release thereof by the gripping means.

It is also pointed out that while blanks of the neck-through type have been disclosed herein the apparatus is equally adapted to forming passages of the type in which the containers are completely housed within the blank and top end portions or necks thereof do not project through nonexistent openings of the blank. In such cases the support 125 would be inactive, as is illustrated in FIG. 9 of the drawings.

While preferred forms and arrangement of parts have been shown in illustrating the invention, it is to be clearly understood that various changes in details and arrangement of parts may be made without departing from the spirit and scope of the invention as defined in the appended claimed subject matter.

I claim:

1. A conveying mechanism comprising a pair of endless members positioned for movement in a generally horizontal plane, means for moving said endless members such that adjacent runs move in the same direction, a plurality of pusher lugs carried by each member, each pusher lug having a nose pointing in the direction of movement of said endless member, means connecting each pusher lug to its associated endless member, and said connecting means including means for providing free relative sliding movement between each pusher and its endless member whereby the pusher lugs automatically and accurately position themselves relative to articles being conveyed by the conveying mechanism.

2. The conveying mechanism as defined in claim 1 wherein each pusher lug includes a leg normally disposed parallel to said adjacent runs, and each slot is disposed at an angle of approximately 45° to the longitudinal center line of its associated leg.

3. A conveying and supporting mechanism comprising means for supporting a group of articles during the movement thereof along a predetermined path, means above said supporting means for conveying the articles along said predetermined path, said supporting means including a plurality of supporting elements each of which is adapted to underlyingly support an associated one of said articles, said supporting elements being spaced a predetermined center line distance from each other as measured along said path, said conveying means including pusher means normally disposed adjacent a trailing one of said articles for contacting the trailing article and thereby pushingly convey the group of articles along said predetermined path, means for moving said supporting and conveying means at substantially similar speeds, and means for adjusting the position of said pusher means relative to said supporting elements along said path whereby different sized articles and/or numbers of articles can be conveyed in groups by said mechanism.

4. The conveying and supporting mechanism as defined in claim 3 wherein said adjusting means is defined in part by said moving means.

5. The conveying and supporting mechanism as defined in claim 3, wherein said supporting and conveying means are endless members, and said adjusting means includes means for relatively rotating one of said endless members relative to the other of said endless members thereby adjusting the position of said pusher means relative to said supporting elements.

6. The conveying and supporting mechanism as defined in claim 3 wherein said supporting and conveying means are endless members, said moving means include rotatable elements about which said endless members are entrained, and said adjusting means include means for relatively rotating the rotatable elements of one of said endless members relative to the rotatable elements of the other endless member.

7. The conveying and supporting mechanism as defined in claim 3, wherein said supporting elements are arranged in groups, and said adjusting means are effective for changing the predetermined distance of the supporting elements from each other thereby changing the relative positions thereof with respect to said pusher means.

8. The conveying and supporting mechanism as defined in claim 3. wherein said adjusting means are effective for changing the predetermined distance of the supporting elements by rotating at least one of the supporting elements 180°.

9. The conveying and supporting mechanism as defined in claim 3 wherein said adjusting means include first means for changing the predetermined distance of the supporting elements by rotating at least one of the supporting elements 180°, and second means for moving said supporting means relative to said conveying means.

10. The conveying and supporting mechanism as defined in claim 3 wherein said supporting and conveying means are endless members, a common shaft about which said members are encircled, each endless member being entrained about an element carried by said common shaft, and said adjusting means is operative for suecing said last-mentioned elements to each other in any one of a plurality of positions of relative rotation therebetween.

11. A conveying mechanism comprising a pair of endless members positioned for movement in a generally horizontal plane, means for moving said endless members such that adjacent runs move in the same direction, a plurality of article supporting means carried by each endless member, said article supporting means being arranged in groups of a predetermined number, and the spacing between at least two of said article supporting means of each group being different than the spacing of adjacent others of said article supporting means of the same group whereby groups of articles different sizes can be conveyed by said mechanism without in any way altering said article supporting means.

12. The conveying mechanism as defined in claim 11 including pusher means for pushing groups of articles in synchronism with the movement thereof by said endless members, and means for adjusting the position of said pusher means relative to said article supporting means whereby different sized articles and/or numbers of articles can be conveyed in groups by said mechanism.

13. The conveying mechanism as defined in claim 12 wherein said pusher means includes a pair of endless members, and each endless member includes a pusher element for each group of said article supporting means.